US011826791B2

(12) United States Patent
Reynolds

(10) Patent No.: US 11,826,791 B2
(45) Date of Patent: Nov. 28, 2023

(54) CREDIT CARD CLEANING APPARATUS

(71) Applicant: Nicholas Reynolds, Humboldt, TN (US)

(72) Inventor: Nicholas Reynolds, Humboldt, TN (US)

( * ) Notice: Subject to any disclaimer, the term of this patent is extended or adjusted under 35 U.S.C. 154(b) by 232 days.

(21) Appl. No.: 17/400,507

(22) Filed: Aug. 12, 2021

(65) Prior Publication Data
US 2023/0053288 A1  Feb. 16, 2023

(51) Int. Cl.
*B08B 1/00* (2006.01)
*B08B 3/04* (2006.01)
*B08B 1/02* (2006.01)

(52) U.S. Cl.
CPC .............. *B08B 1/002* (2013.01); *B08B 1/02* (2013.01); *B08B 3/04* (2013.01)

(58) Field of Classification Search
CPC .............. B60S 1/02; B60S 1/002; B60S 3/04
See application file for complete search history.

(56) References Cited

U.S. PATENT DOCUMENTS

| 3,428,988 A * | 2/1969 | Blackburn | A46B 15/00 15/160 |
| 3,800,349 A | 4/1974 | Green | |
| 4,104,758 A | 8/1978 | Stotler | |
| 5,253,383 A * | 10/1993 | Clark | A63F 3/068 15/40 |
| 5,461,747 A * | 10/1995 | Clausen | A47L 25/00 15/210.1 |
| 2019/0291149 A1 | 9/2019 | Damskov | |

FOREIGN PATENT DOCUMENTS

WO    WO9940835    8/1999

\* cited by examiner

*Primary Examiner* — Andrew A Horton

(57) ABSTRACT

A credit card cleaning apparatus for quickly and conveniently sanitizing a credit card includes a housing having a housing top side, a housing bottom side, a housing front side, a housing back side, a housing left side, and a housing right side. The housing front side is spaced apart from the housing back side in parallel opposition defining a housing interior. The housing top side has a card slot extending through to the housing interior. The housing receives a credit card through the card slot. A brush is coupled to the housing. The brush is coupled to the housing back side within the housing interior and is saturated with a sanitizing solution. The brush applies the sanitizing solution to the credit card when it is inserted through the card slot.

8 Claims, 4 Drawing Sheets

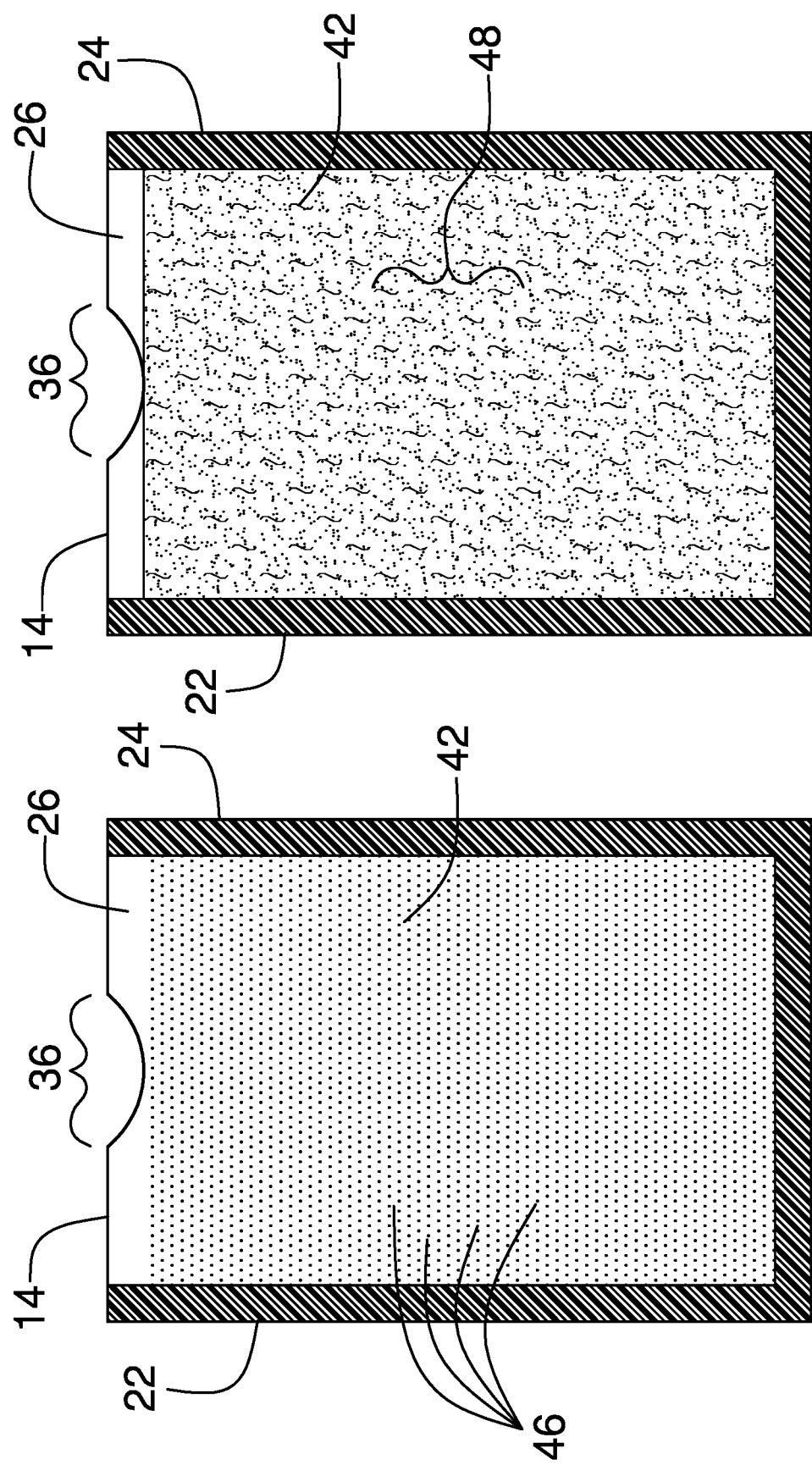

CREDIT CARD CLEANING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sanitizing devices and more particularly pertains to a new sanitizing device for quickly and conveniently sanitizing a credit card. The present device includes a thin housing with a card slot to receive a credit card. A brush inside of the housing is saturated with a sanitary solution that is passed onto the credit card as it is inserted and removed through the card slot.

(2) Description of Related Art Including Information Disclosed Under 37 CFR 1.97 and 1.98

The prior art relates to sanitizing devices. Known devices often include larger mechanisms with moving parts and are not portable. These devices also do not store a sanitary solution to be applied to the card. Known devices also lack a transparent window to view the card while inserted within the device.

BRIEF SUMMARY OF THE INVENTION

An embodiment of the disclosure meets the needs presented above by generally comprising a housing having a housing top side, a housing bottom side, a housing front side, a housing back side, a housing left side, and a housing right side. The housing front side is spaced apart from the housing back side in parallel opposition defining a housing interior. The housing top side has a card slot extending through to the housing interior. The housing is configured to receive a credit card through the card slot. The housing is dimensioned to receive the credit card through the card slot such that when it contacts the housing bottom side a credit card back edge aligns with the housing top side. A brush is coupled to the housing. The brush is coupled to the housing back side within the housing interior and is configured to be saturated with a sanitizing solution. The brush applies the sanitizing solution to the credit card when it is inserted through the card slot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a cross-sectional view of an embodiment of the disclosure along the line 5-5 of FIG. 4.

FIG. 6 is a cross-sectional view of an embodiment of the disclosure.

DETAILED DESCRIPTION OF THE INVENTION

Figure 1:
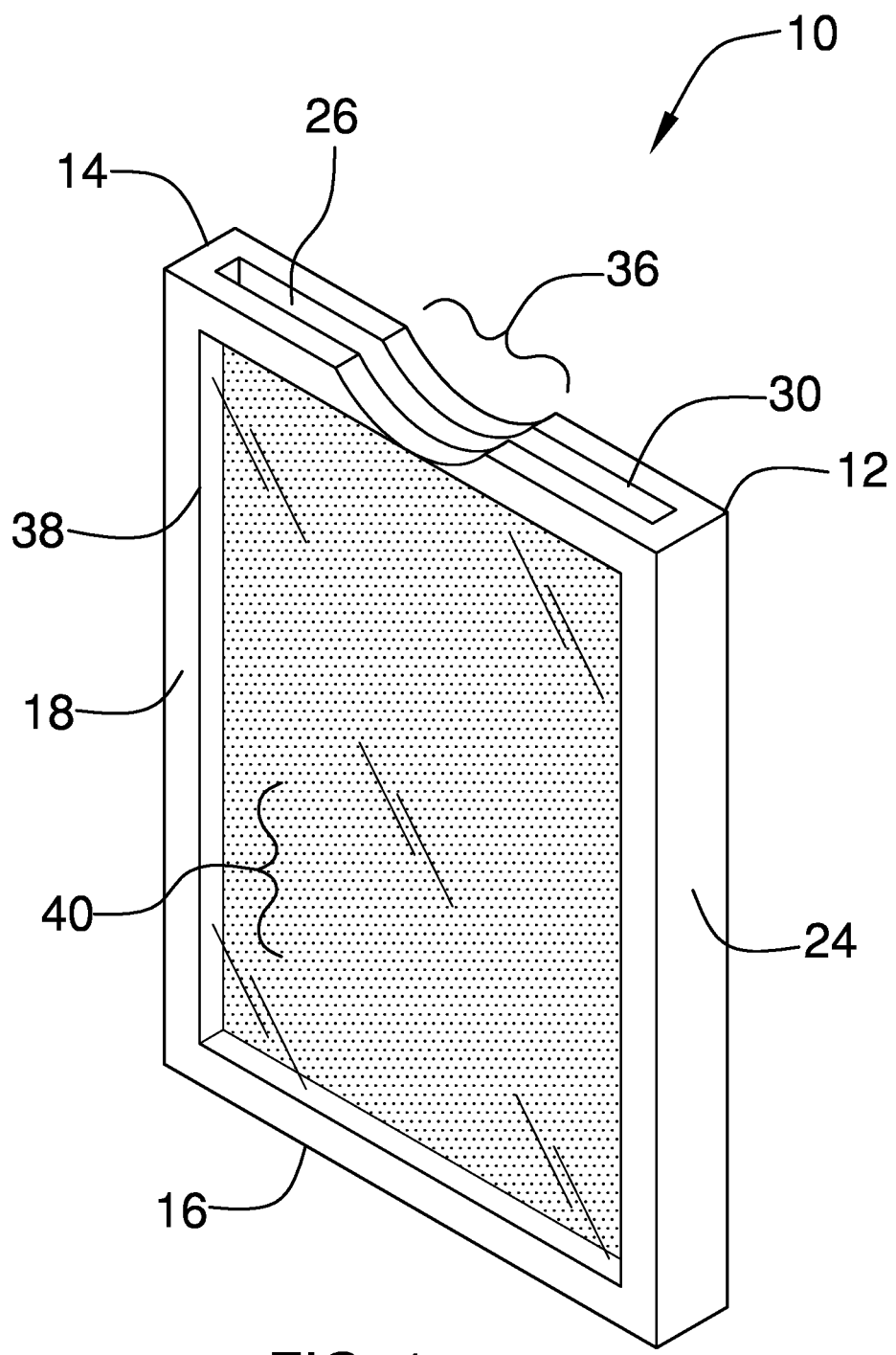
FIG. 1 is an isometric view of a credit card cleaning apparatus according to an embodiment of the disclosure.
Figure 2:
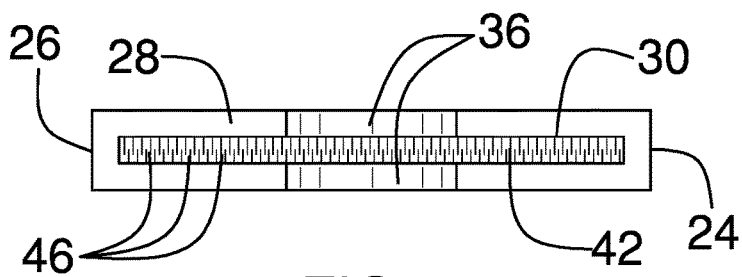
FIG. 2 is a top plan view of an embodiment of the disclosure.
Figure 3:
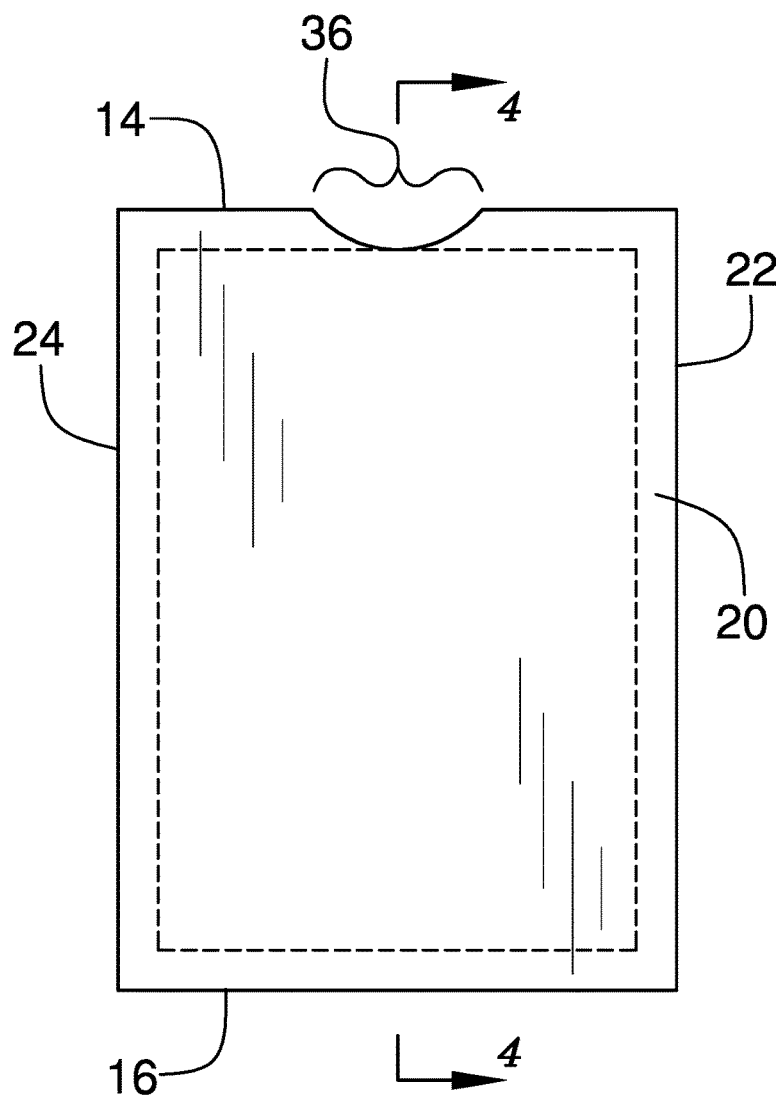
FIG. 3 is a rear elevation view of an embodiment of the disclosure.
Figure 4:
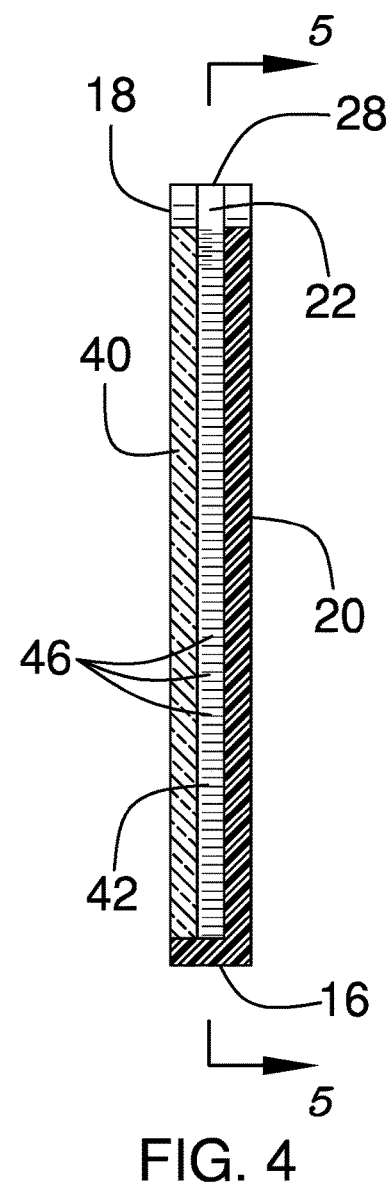
FIG. 4 is a cross-sectional view of an embodiment of the disclosure along the line 4-4 of FIG. 3.
Figure 8:
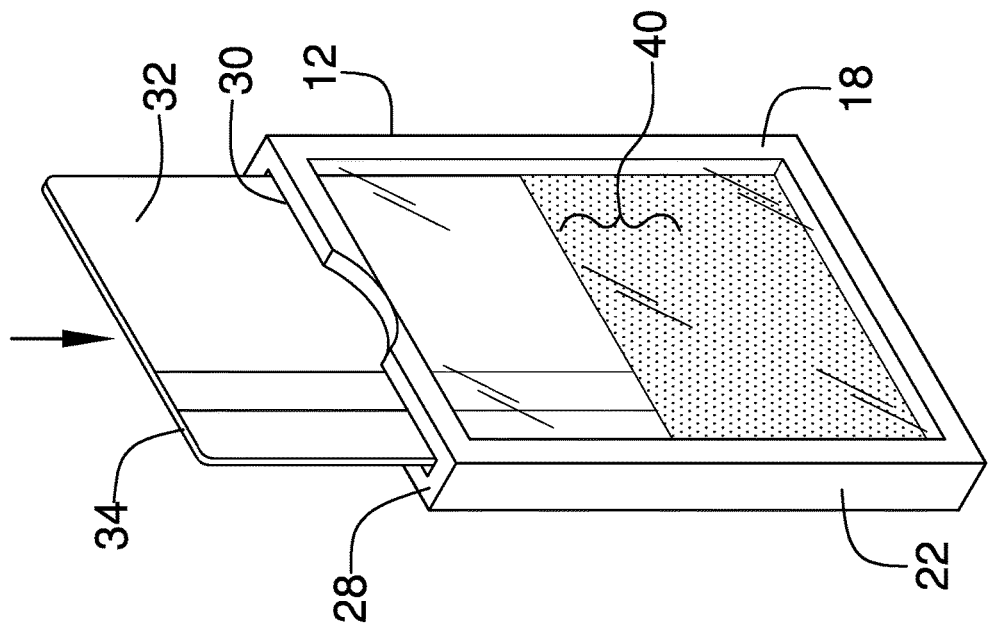
FIG. 8 is an in-use view of an embodiment of the disclosure.
Figure 7:
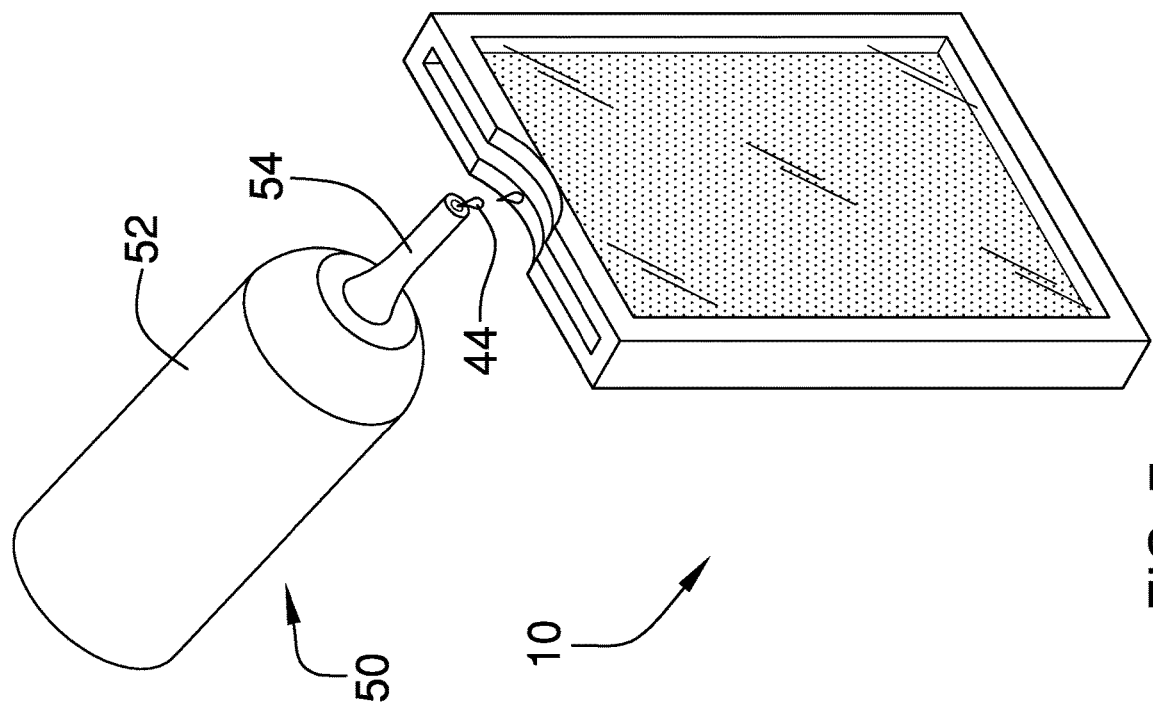
FIG. 7 is an in-use view of an embodiment of the disclosure.

With reference now to the drawings, and in particular to FIGS. 1 through 8 thereof, a new sanitizing device embodying the principles and concepts of an embodiment of the disclosure and generally designated by the reference numeral 10 will be described.

As best illustrated in FIGS. 1 through 8, the credit card cleaning apparatus 10 generally comprises a housing 12 having a housing top side 14, a housing bottom side 16, a housing front side 18, a housing back side 20, a housing left side 22, and a housing right side 24. The housing front side 18 is spaced apart from the housing back side 20 in parallel opposition defining a housing interior 26. The housing top side 28 has a card slot 30 extending through to the housing interior 26.

The housing 12 is configured to receive a credit card 32 through the card slot 30. The housing 12 is dimensioned such that when it contacts the housing bottom side 16 a credit card back edge 34 aligns with the housing top side 14. The width of the housing interior 26 between the housing left side 22 and the housing right side 24 may be between 54 mm and 60 mm. The depth of the housing interior 26 between the housing bottom side 16 and the housing top side 14 may be between 85 mm and 90 mm. Each of the housing front side 18 and the housing back side 20 may each have a medial cutout portion 36 extending from the housing top side 14. The medial cutout portion 36 may be arcuate and dimensioned to allow a user's fingers to secure the credit card 32 below the credit card back edge 34.

The housing front side 18 may have a window aperture 38. The window aperture 38 may be rectangular and extends from adjacent the housing left side 22 to adjacent the housing right side 24. The window aperture 38 may extend from adjacent the housing bottom side 16 to below the medial cutout portion 36. A transparent window 40 is coupled within the window aperture 38 to allow visibility of the credit card 32 while inserted.

A brush 42 is coupled to the housing 12. The brush 42 is coupled to the housing back side 20 within the housing interior 26. The brush 42 is configured to be saturated with a sanitizing solution 44 and applies the sanitizing solution 44 to the credit card 32 when it is inserted through the card slot 30. The brush 42 may be continuously coupled to the housing back side 20 within the housing interior 26 from the housing left side 22 to the housing right side 24 and from the housing bottom side 16 to below the medial cutout portion 36. The brush 42 may include a plurality of bristles 46 perpendicularly extending from the housing back side 20 and extending to proximal the housing front side 18. The plurality of bristles 46 are semi-rigid and clean the credit card 32 with friction while applying the sanitizing solution 44. The brush 42 may alternatively be an absorbent pad 48 as shown in FIG. 6.

A portable solution bottle 50 may be included with the apparatus 10. The portable solution bottle 50 has a canister body 52 filled with the sanitizing solution 44 and a drip nozzle 54 to accurately transfer the sanitizing solution into the housing interior 26.

In use, the housing interior 26 is filled with sanitizing solution 44. The credit card 32 is then inserted and removed through the card slot 30 to be cleaned by the brush 42 and the sanitizing solution. The credit card 32 may be rotated and flipped between insertions to evenly clean all surfaces.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A credit card cleaning apparatus comprising:
    a housing having a housing top side, a housing bottom side, a housing front side, a housing back side, a housing left side, and a housing right side, the housing front side being spaced apart from the housing back side in parallel opposition defining a housing interior, the housing top side having a card slot extending through to the housing interior, the housing being configured to receive a credit card through the card slot, the housing being dimensioned to receive the credit card through the card slot such that when it contacts the housing bottom side a credit card back edge aligns with the housing top side, each of the housing front side and the housing back side having a medial concave cutout portion defining an arcuate edge extending from the housing top side towards the housing bottom side; and
    a brush being coupled to the housing, the brush being coupled to the housing back side within the housing interior, the brush being configured to be saturated with a sanitizing solution and applying the sanitizing solution to the credit card when it is inserted through the card slot.

2. The credit card cleaning apparatus of claim 1 further comprising the width of the housing interior between the housing left side and the housing right side being between 54 mm and 60 mm, the depth of the housing interior between the housing bottom side and the housing top side being between 85 mm and 90 mm.

3. The credit card cleaning apparatus of claim 1 further comprising the housing front side having a window aperture; a transparent window coupled within the window aperture.

4. The credit card cleaning apparatus of claim 3 further comprising the window aperture being rectangular and extending from adjacent the housing left side to adjacent the housing right side.

5. The credit card cleaning apparatus of claim 1 further comprising the brush including a plurality of bristles perpendicularly extending from the housing back side.

6. The credit card cleaning apparatus of claim 5 further comprising the plurality of bristles extending to proximal the housing front side.

7. The credit card cleaning apparatus of claim 1 further comprising the brush being an absorptive pad.

8. A credit card cleaning apparatus comprising:
    a housing having a housing top side, a housing bottom side, a housing front side, a housing back side, a housing left side, and a housing right side, the housing front side being spaced apart from the housing back side in parallel opposition defining a housing interior, the housing top side having a card slot extending through to the housing interior, the housing being configured to receive a credit card through the card slot, the housing being dimensioned such that when it contacts the housing bottom side a credit card back edge aligns with the housing top side, the width of the housing interior between the housing left side and the housing right side being between 54 mm and 60 mm, the depth of the housing interior between the housing bottom side and the housing top side being between 85 mm and 90 mm, each of the housing front side and the housing back side having a medial concave cutout portion defining an arcuate edge extending from the housing top side towards the housing bottom side the housing front side having a window aperture, the window aperture being rectangular and extending from adjacent the housing left side to adjacent the housing right side;
    a transparent window coupled within the window aperture; and a brush being coupled to the housing, the brush being coupled to the housing back side within the housing interior, the brush being configured to be saturated with a sanitizing solution and applying the sanitizing solution to the credit card when it is inserted through the card slot, the brush including a plurality of bristles perpendicularly extending from the housing back side, the plurality of bristles extending to proximal the housing front side.

\* \* \* \* \*